Patented Dec. 2, 1924.

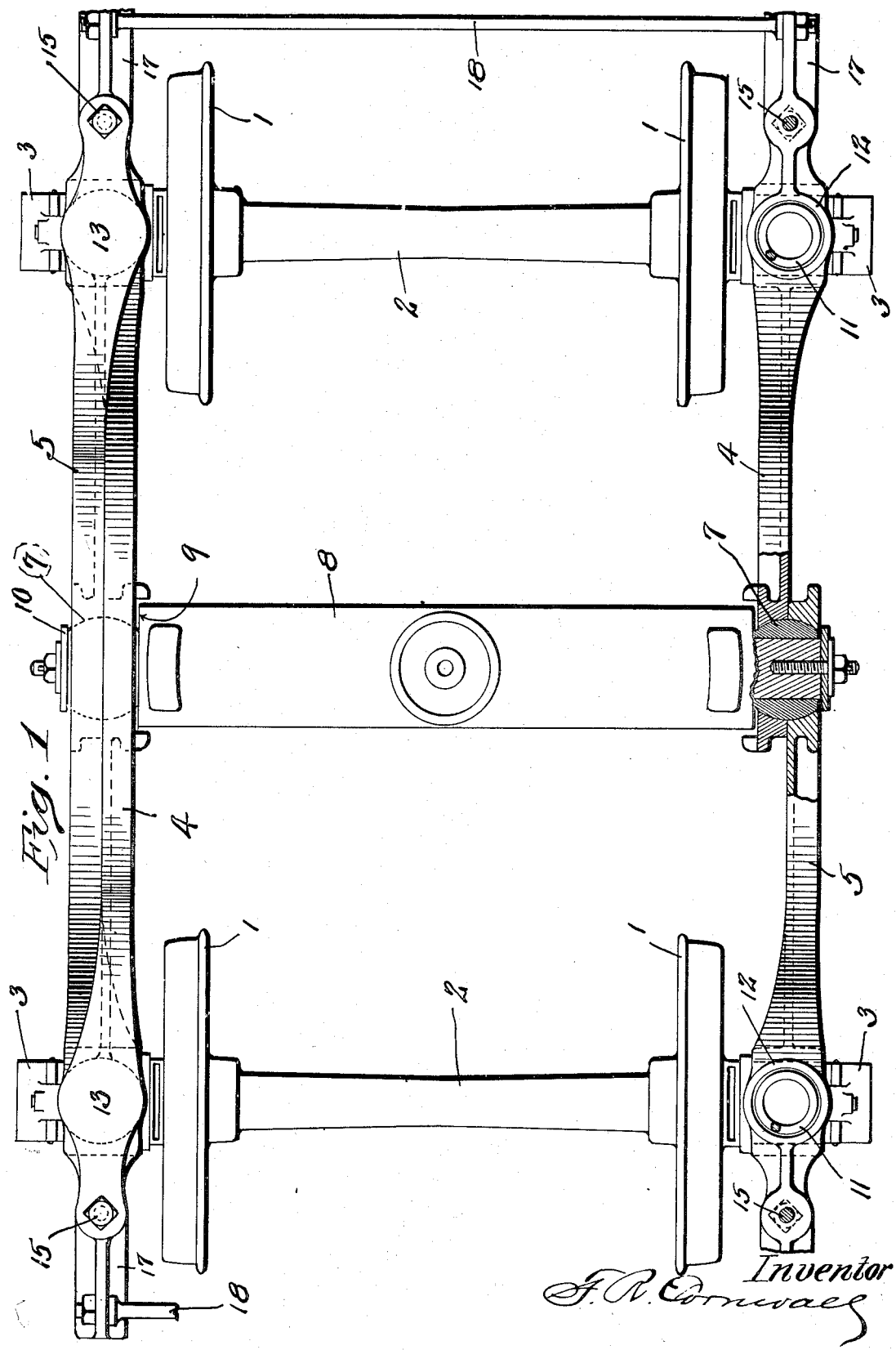

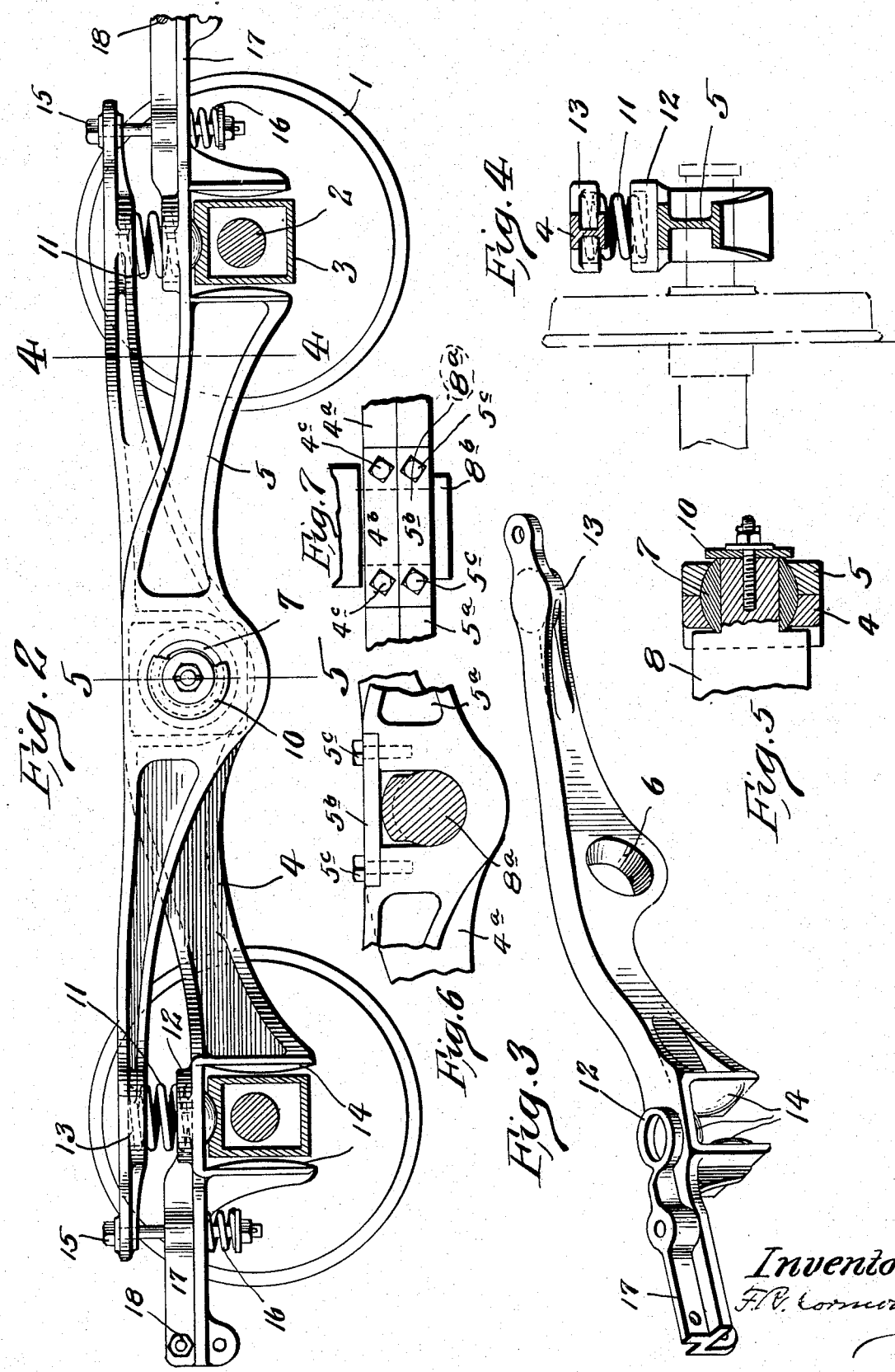

1,517,535

UNITED STATES PATENT OFFICE.

FREDERICK R. CORNWALL, OF ST. LOUIS, MISSOURI; MAY BUSHALL CORNWALL, EXECUTRIX OF SAID FREDERICK R. CORNWALL, DECEASED, ASSIGNOR, BY MESNE ASSIGNMENTS, TO MAY B. CORNWALL, OF ST. LOUIS, MISSOURI.

FOUR-WHEEL TRUCK.

Application filed November 27, 1922. Serial No. 603,591.

*To all whom it may concern:*

Be it known that I, FREDERICK R. CORNWALL, a citizen of the United States, residing at St. Louis, Missouri, have invented a certain new and useful Improvement in Four-Wheel Trucks, of which the following is a full, clear, and exact description, such as will enable others skilled in the art to which it appertains to make and use the same, reference being had to the accompanying drawings, forming part of this application.

My invention relates to railway rolling stock and consists in an improved truck.

The object of my invention is to provide a flexible car truck of simple economical construction and reference is made herein to the monorail construction shown in my copending application Serial No. 537,329, filed February 17, 1922, which embodies some of the principles of my present construction.

In the accompanying drawings which illustrate a selected embodiment of my invention—

Figure 1 is a top view of my truck.

Figure 2 is a side elevation of the same.

Figure 3 is a perspective detail of one of the truck wheel pieces.

Figure 4 is a vertical transverse section taken approximately on line 4—4 of Figure 2.

Figure 5 is a similar section taken on line 5—5 of Figure 2.

Figure 6 is a side elevational view of a modified form of truck bolster bearing.

Figure 7 is a plan view of the form shown in Figure 6.

My truck utilizes the ordinary wheels 1, axles 2, and journal boxes 3. Each truck side frame comprises a pair of crossed arms 4 and 5 each having one end seated upon a journal box 3 and the other end extending over the other journal box on that side of the truck and yieldingly supported from the other cross piece which has one end mounted upon that journal box. At their crossing points wheel pieces 4 and 5 are provided with opposed spherical recesses 6 which cooperate to form a socket adapted to receive the spherical end 7 of a cast steel bolster 8. The wheel pieces and the bolster are positively retained in assembled position by the opposed faces of a shoulder 9 on the bolster and a retaining washer 10 removably secured to the end of the bolster. The two wheel pieces are yieldingly maintained in assembled position by virtue of the centering effect of springs 11, each compressed between an upwardly facing seat 12 upon the journal box engaging end of one wheel piece and a downwardly facing seat 13 upon the adjacent end of the other wheel piece. These springs are compressed by the weight of the load upon bolster 8 transferred to the wheel pieces through the ball and socket joint.

The journal box engaging portion of each wheel piece is formed with spherical bosses 14 whereby a swiveling contact with the journal box is provided which, with the ball and socket assembly of the two wheel pieces and the bolster, enables the truck to flex at any one of a plurality of points according to the application of stresses thereto.

I prefer to provide the ends of the wheel pieces with a simple shock absorbing device comprising a bolt 15 and a spring 16 confined between one end thereof and the opposing face of one of the wheel pieces and the expansion of which opposes the expansion of spring 11. These elements will damp the normal vibrations produced by springs 11 and when the truck is separated from the car will prevent an abnormal position of the wheel pieces which would render their assembly with each other and with the bolster too loose to permit the truck to be moved about with safety.

Each of the side frames 4 and 5 is provided with a horn-like extension 17 projecting beyond the journal box pedestals, said extensions providing a support for the brake rigging and also means for attachment of a tie-bolt or rod 18 constituting an end frame on the truck. This tie bolt is preferably upset or provided with integral heads near each end, with threaded extremities whereby the same may be secured by nuts in position to the extensions 17, but by virtue of its flexibility said tie-bolt can be flexed slightly to accommodate the weaving movement of the truck frame members in service.

Referring to Figures 6 and 7, the bolster member 8 is provided with a finned trunnion 8ª at each end which trunnion has an enlarged head 8ᵇ. The fin portion of the trunnion extends upwardly so as to afford a circular seat at the bottom face of the trunnions, which circular seat fits in recesses in the side frame members 4ᵃ and 5ᵃ. The recesses in these side frame members are open at the top, said openings being closed by plates 5ᵇ and 4ᵇ, said plates being held in position by bolts 5ᶜ and 4ᶜ. In operation, the plates 4ᵇ and 5ᵇ, by spanning the trunnion seats, serve as compression blocks and enable the bolster to be introduced into the side frames of a truck from above. This dispenses with the rocker bearing and washers and other detachable parts, because the head 8ᵇ of the trunnion, by being integral, tends to hold the side truck frames in proper position on the trunnion, there being sufficient play to permit slight flexibility of the parts.

It will be further observed that the truck side frames are so disposed as to give access to the brake heads or shoes, whether inside or outside hung, without necessitating the unhinging of the brake beams. The distance of the springs 11 from the pivotal connection between the crossed side frames determines the length and character of said springs, each spring serving as a yielding support both for the bolster and for the journal box. Hence, these springs are practically universal in action. The truck wheels are flexibly connected for independent arcuate movement, the axis of their movement being the pivotal connection between the truck side frames. The point of reaction of the superposed load, through the bolster is at the pivotal point of connection of the side frames of the truck and is equally distributed by said side frames upon the journal boxes and supporting springs, respectively. Thus, said side frames serve in effect as equalizing members in equally distributing the load from the bolster between the journal boxes.

Each wheel piece is preferably formed from a single casting having the I-shaped section, shown in Figure 4. This construction enables the metal to be disposed so as to secure the desired cross-section at any point and enables the wheel pieces to be manufactured with the highest degree of economy in cost and weight.

Obviously, the positioning of springs 11 longitudinally of the wheel pieces may be varied without affecting the principle of operation and various other details of the truck may be changed without departing from the spirit of my invention.

I claim:

1. In a car truck, a pair of wheel pieces crossed in a vertical plane and pivoted together at their crossing point, each supported at both of its ends, and a bolster supported at one end by said pieces.

2. In a car truck, a pair of wheel pieces crossed in a vertical plane and pivoted together at their crossing point, each supported at both ends, and a bolster supported at one end by said pieces at their intersection.

3. In a car truck, a pair of wheel pieces crossed in a vertical plane and pivoted together at their crossing point, each supported at both of its ends, and a bolster supported at one end by said pieces at their intersection by means of a universal joint.

4. In a car truck, a pair of wheel pieces crossed in a vertical plane and pivoted together at their crossing point, each supported at both of its ends and having at least one end yieldingly supported, and a bolster supported at one end by said pieces.

5. In a car truck, wheeled axles, a pair of wheel pieces crossed in a vertical plane and pivoted together at their crossing point, each having one end supported upon one of said axles and having its opposite end supported directly above the other of said axles, and a bolster supported at one end by said pieces.

6. In a car truck, wheeled axles, a pair of wheel pieces crossed in a vertical plane and pivoted together at their crossing point, each having one end rigidly supported upon one of said axles and having its opposite end yieldingly supported directly above the other of said axles, and a bolster supported at one end by said pieces.

7. In a car truck, a bolster having a ball terminal, and crossed wheel pieces cooperating to provide a socket adapted to receive said ball terminal, and pivotally assembled with each other.

8. In a car truck, axle journal boxes, a bolster, crossed wheel pieces pivoted to each other to swing in a vertical plane and supporting one end of said bolster, each of said pieces supported near one end upon one of said journal boxes and near its opposite end yieldingly supported upon the other wheel piece, and a yielding tension connection between the adjacent ends of said wheel pieces.

9. In a car truck, axle journal boxes, a pair of wheel pieces crossing each other in a vertical plane, each supported near one end upon one of said journal boxes, yielding means interposed between its opposite end and the other wheel piece, and shock absorbing elements opposing said means.

10. In a car truck, side frames each comprising crossed wheel pieces, each of which is supported at its ends upon a journal box and the other wheel piece respectively, and a pivoted connection between the journal box supported ends of opposite wheel pieces.

11. In a car truck, axle journal boxes, a bolster having spherical ends, side frames each comprising a pair of associated wheel pieces provided intermediate their ends with opposed sockets adapted to engage one of said bolster ends, each wheel piece at one end having a pivotal engagement with one of said journal boxes and with the corresponding wheel piece on the opposite side of the car and at its other end being supported upon the associated wheel piece.

12. In a car truck, a bolster having a spherical end, crossed wheel pieces provided at their crossing point with opposed recesses adapted to receive said bolster end, and means securing said wheel pieces against lateral separation.

13. A cast wheel piece for car trucks including a laterally presented socket near its longitudinal center, a downwardly facing journal box receiving recess near one end and an upwardly facing spring seat near said recess, and a downwardly facing spring seat near its opposite end located in the same vertical plane as said upwardly facing spring seat.

14. A cast wheel piece for car trucks including a laterally presented socket near its longitudinal center, an inverted U-shaped recess near one end, the walls and bottom of said recess having convex spherical contours to provide swiveling engagement thereof with a journal box, an upwardly facing spring seat above said recess and a downwardly facing spring seat at its opposite end adapted to align vertically with the upwardly facing spring seat of a similar cooperative wheel piece.

15. In a car truck, a pair of crossed wheel pieces pivotally connected together, a bolster supported by said wheel pieces, and end frame connections between said wheel pieces.

16. In a car truck, a pair of crossed wheel pieces pivotally connected together, a bolster supported thereby, and extensions projecting beyond certain of said wheel pieces providing supports for the brake beam.

17. In a car truck, a pair of crossed wheel pieces pivotally connected together and each of which is provided with horn-like extensions and tie rods connecting said extensions.

18. In a car truck, a pair of crossed wheel pieces pivotally connected together, a bolster trunnioned in said wheel pieces, means on said bolster for holding said wheel pieces in assembled relation, and springs introduced between the ends of said crossed wheel pieces.

19. A car truck whose wheels are pivotally connected together for independent arcuate movement, and a bolster for transmitting the load equally between the wheels and at a point coincident with the pivotal connection between the side frames of the truck.

20. A car truck having crossed side frames pivotally connected together, springs interposed between their ends, and means for applying the load to the pivotal point of connection between said frames, whereby said frames serve to act as equalizing bars.

21. In a car truck, the combination of wheels, axles and their journal boxes, of truck side frames pivotally supported at one end upon said journal boxes, and pivotally connected together at a point between their ends, and springs co-operating with the free ends of said truck side frames on opposite sides of their pivotal point of connection.

In testimony whereof I hereunto affix my signature this 24th day of November, 1922.

FREDERICK R. CORNWALL.